Figure 1:
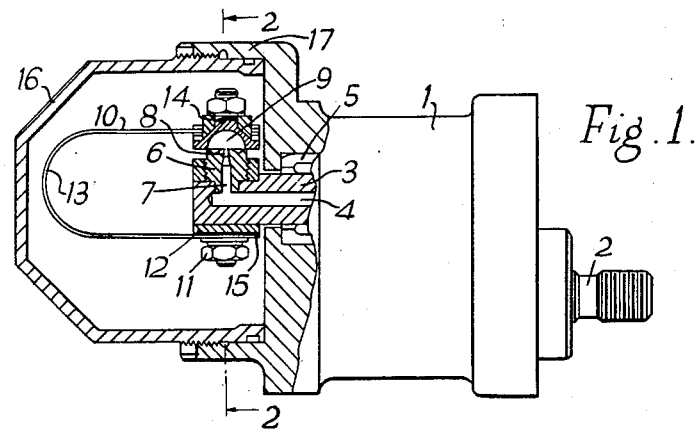

May 7, 1963

M. KELLNER 3,088,476

SPILL-TYPE CENTRIFUGAL GOVERNORS

Filed July 22, 1960

2 Sheets-Sheet 1

Inventor:
Michael Kellner
By:
William E. G. Bayly
Attorney.

May 7, 1963  M. KELLNER  3,088,476
SPILL-TYPE CENTRIFUGAL GOVERNORS
Filed July 22, 1960  2 Sheets-Sheet 2
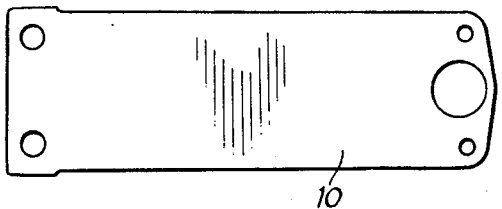
Fig. 4.
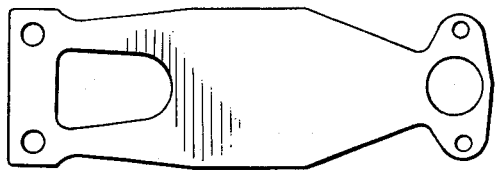
Fig. 5.
Fig. 6.
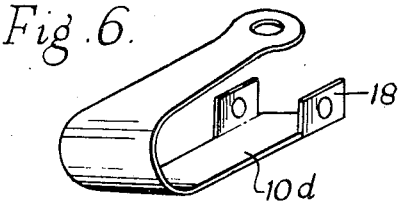
Fig. 7.
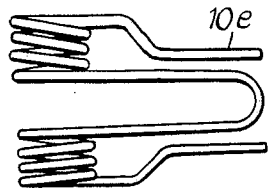
Fig. 8
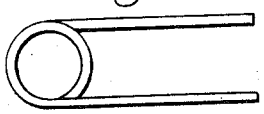
Inventor:
Michael Kellner
By
William E. T. Boyle
Attorney.

United States Patent Office 3,088,476
Patented May 7, 1963

3,088,476
SPILL-TYPE CENTRIFUGAL GOVERNORS
Michael Kellner, London, England, assignor to The Plessey Company Limited, London, England, a British company
Filed July 22, 1960, Ser. No. 46,850
3 Claims. (Cl. 137—56)

This invention relates to centrifugal governors of the type in which a valve member is urged onto a seat to close the end of a radial passage in a rotating spindle, by a flexure-stressed spring which extends transversely to the valve movement and which therefore, when a certain speed of rotation is reached, becomes flexed by the centrifugal action of the valve member to lift the latter off its seat so as to allow, when the passage is connected to a fuel pump or other source of liquid under pressure, part of the liquid to spill through the radial passage. In a previously proposed governor of the kind specified the spring consists of a blade spring extending longitudinally of the spindle at one side of the spindle axis, the end of the spring remote from the valve being clamped to a fixing means provided on the shaft. In order to ensure dynamic balance it was generally found necessary to provide separate balance weights respectively balancing the fixing means and the valve member, the two balance weights being spaced along the spindle according to the two ends of the spring; even with this relatively complicated balancing system it was generally found necessary to provide for the shaft a support bearing at the end of the shaft adjacent the fixing point of the spring in addition to a journal bearing adjacent to the valve member. The present invention has for an object to reduce these difficulties.

According to the invention the flexure-stressed spring urging the valve member on to its seat is of the hair-pin type comprising two parallel shanks joined by a bent portion and is so arranged that the two ends of the hair-pin spring lie on opposite sides of the spindle axis in a plane containing the spindle axis and both said ends lie in a plane normal to this axis. In a generally perferred construction the shanks of the hair-pin spring extend longitudinally of the spindle, the bent portion being arranged beyond the end of the spindle, but if a particularly short construction is required, two hair-pin springs extending transversely of the spindle may be arranged symmetrically to the valve at opposite sides thereof.

The invention is illustrated in the drawings acompanying the specification.

Figure 2:
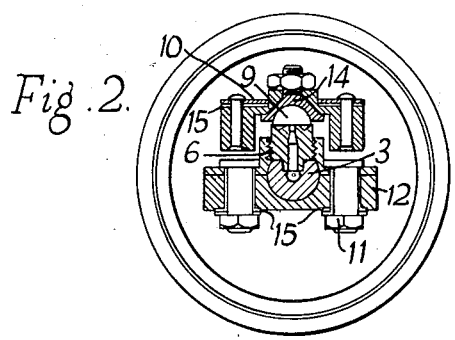
Figure 3:
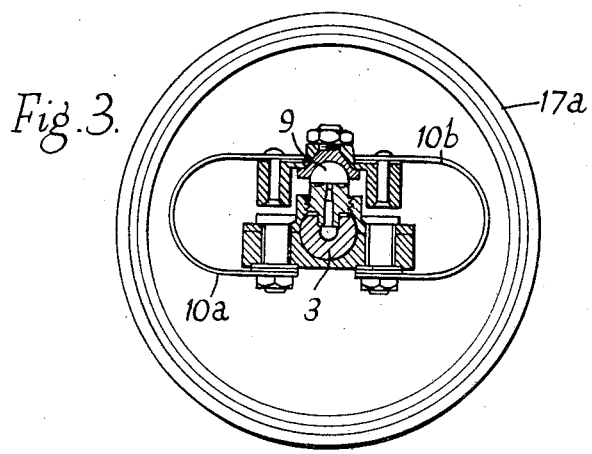

FIGURE 1 is a side elevation, partly in section, showing a governor according to the invention mounted on one of the gear spindles of a gear-type fuel pump, FIGURE 2 is a section substantially on line 2—2 of FIGURE 1 with the protective housing removed, FIGURE 3 is a similar section of a modified arrangement, FIGURES 4 and 5 show respectively two forms of blank suitable for the hair-pin spring, FIGURE 6 is a perspective view of a modified hair-pin blade spring, and FIGURES 7 and 8 are respectively a plan view and an elevation of a hair-pin spring made of wire.

The arrangement illustrated in FIGURES 1 and 2 comprises a governor according to the invention combined with a gear pump and may be used as a governor which controls the speed of a combustion engine by arranging for part of the fuel supply to spill back to the fuel tank from a point of the delivery system before reaching the point of injection into the engine combustion system. The gear pump 1 has a driven shaft 2 being the shaft of the driving one of the pumping gears, while the shaft 3 of the driven pumping gear projects through the end wall of the housing and has a blind bore 4 communicating with the delivery chamber of the pump. The shaft 3 of the driven gear is supported in the pump housing by a bearing 5 and carries outside the pump housing a nipple 6 containing a radial passage 7 leading to a spill port 8. When the pump is stationary, the spill port 8 is closed by a valve element 9 of hemispherical shape. In order to urge the valve element 9 on to its seat, one end of a hair-pin spring 10 of flat spring steel is anchored by bolts 11 to a base 12 rigidly secured on or intergral with the shaft 3 at a point diametrically opposite to the spill port 8. The spring 10 extends parallel to the axis of the shaft 3, with its curved portion 13 arranged beyond the end of the shaft, while its free end carries a socket block 14, shims 15 being interposed as required between the base 12 and the spring 10 to adjust the preloading of the spring. When the pump is in operation and a predetermined speed is reached, the centrifugal force acting upon the valve member 9 and the socket member 14 will, jointly with the pressure inside the spill port 8, balance the pre-loading of the spring 10, and if the speed increases further, the valve member 9 will allow liquid to spill through passages 4 and 7, thus reducing the effective delivery of the pump. The liquid spilled in this manner is collected in the housing member 16 which encloses the governor and from which it is drained in any suitable manner to return to the tank.

FIGURE 3 shows a modified arrangement, in which two hair-pin springs 10a and 10b are arranged transversely of the shaft 3 at opposite sides thereof, the construction of the other elements being virtually unchanged except that the diameter of the collar 17a of the pump housing, which serves to accommodate a governor housing otherwise similar to the housing 16 shown in FIGURE 1, is made of larger diameter than the collar 17 in FIGURE 1 in view of the transverse extension of the hair-pin blade springs 10a and 10b.

It will be appreciated that details of the illustrated embodiments may be modified within the scope of the invention. More particularly the shape of the hair-pin spring may vary.

FIGURE 4 shows the blank for one form of the hair-pin spring 10 of FIGURES 1 and 2 in which the spring is formed as a straight-sided blade, and which may also serve as the blank for each of the hair-pin springs 10a and 10b of FIGURE 3. The shape of the blank may be modified to give approximately constant stress, for example as shown in FIGURE 5.

FIGURE 6 shows a further modification showing a spring 10d which at the end to be attached to the shaft is formed with two lateral tabs 18 turned up at 90° to the plane of the lower leaf of the hair-pin spring. When the spring is thus modified, a single bolt will be sufficient to hold the spring and clamp the base onto the shaft, and the spring may be pin-jointed about the axis of this bolt when this is desired.

Furthermore instead of using a spring blade bent to hair-pin shape, a helical hair-pin spring 10e of the kind shown in FIGURES 7 and 8 may be used; in this case the ends of the wire may be fixed to the base by grub screws or by brazing or welding.

What I claim is:

1. A centrifugal governor of the kind including a rotary governor spindle having a radial passage terminating in a spill port at the circumference of the spindle, means connecting the passage to a source of liquid under pressure, a valve member co-operating with the spill port, and a hair-pin type spring having two parallel shanks joined by a bent portion, the valve member being carried by one of said shanks adjacent to its end, and the end of the other shank being secured to the spindle substantially at the point of symmetry to the valve member in relation to the plane containing the axis of the governor spindle and disposed perpendicularly to the plane containing said shanks of the spring.

2. A centrifugal governor of the kind including a rotary governor spindle having a radial passage terminating in a spill port at the circumference of the spindle, means connecting the passage to a source of liquid under pressure, a valve member co-operating with the spill port, and two hair-pin springs extending transversely of the spindle and arranged symmetrically to the valve member at opposite sides of a plane containing the axes of both the spindle and the valve member, each hair-pin spring having two parallel shanks joined by a bent portion, and the valve member being jointly carried by one shank of each hair-pin spring adjacent to the end of said shank, the free ends of the other shanks being secured to the spindle substantially at the point of symmetry to the valve in relation to the plane containing the axis of the governor spindle and disposed parallel to the shanks of the springs.

3. A centrifugal governor as claimed in claim 1, wherein the shanks of the hair-pin spring extend longitudinally of the spindle, the bent portion of the spring being arranged beyond the end of the governor spindle.

References Cited in the file of this patent
UNITED STATES PATENTS

| | | |
|---|---|---|
| 110,703 | Waters | Jan. 3, 1871 |
| 1,751,982 | Dunham | Mar. 25, 1930 |
| 2,443,659 | Lambert | June 22, 1948 |
| 2,467,445 | Schwender | Apr. 19, 1949 |
| 2,612,406 | Kurata | Sept. 30, 1952 |
| 2,641,192 | Lindberg | June 9, 1953 |
| 2,787,224 | Udale | Apr. 2, 1957 |
| 2,896,653 | Marlin | July 28, 1959 |
| 3,040,761 | Moss | June 26, 1962 |
| 3,045,686 | Broad | July 24, 1962 |